(12) United States Patent
Okamura

(10) Patent No.: US 11,859,055 B2
(45) Date of Patent: Jan. 2, 2024

(54) POLYSILOXANE MONOMER AND METHOD FOR PRODUCING SAME

(71) Applicant: Shin-Etsu Chemical Co., Ltd., Tokyo (JP)

(72) Inventor: Kaoru Okamura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 622 days.

(21) Appl. No.: 15/733,955

(22) PCT Filed: May 31, 2019

(86) PCT No.: PCT/JP2019/021815
§ 371 (c)(1),
(2) Date: Dec. 1, 2020

(87) PCT Pub. No.: WO2019/235390
PCT Pub. Date: Dec. 12, 2019

(65) Prior Publication Data
US 2021/0238363 A1     Aug. 5, 2021

(30) Foreign Application Priority Data

Jun. 4, 2018  (JP) ................. 2018-106924

(51) Int. Cl.
C08G 77/388  (2006.01)
G02C 7/04    (2006.01)

(52) U.S. Cl.
CPC ............. *C08G 77/388* (2013.01); *G02C 7/04* (2013.01)

(58) Field of Classification Search
USPC ......................................................... 528/32
See application file for complete search history.

(56) References Cited

U.S. PATENT DOCUMENTS

| | | | |
|---|---|---|---|
| 2004/0106694 A1 | 6/2004 | Fujisawa et al. | |
| 2007/0142583 A1* | 6/2007 | Schorzman ........... | C08F 230/08 526/279 |
| 2011/0160330 A1 | 6/2011 | Nagai et al. | |
| 2013/0120708 A1 | 5/2013 | Driver | |
| 2014/0135408 A1 | 5/2014 | Wang et al. | |

FOREIGN PATENT DOCUMENTS

| | | | | |
|---|---|---|---|---|
| EP | 3611196 A1 | 2/2020 | | |
| JP | H0517324 A | 1/1993 | | |
| JP | H07502053 A | 3/1995 | | |
| JP | 2000186117 A | 7/2000 | | |
| JP | 2001323024 A | * 11/2001 | ............ | C07F 7/0852 |
| JP | 2001323024 A | 11/2001 | | |
| JP | 2002363220 A | 12/2002 | | |
| JP | 2009521546 A | 6/2009 | | |
| JP | 2014505067 A | * 2/2014 | | |
| JP | 2014505067 A | 2/2014 | | |
| JP | 2014533304 A | * 12/2014 | | |
| JP | 2014533304 A | 12/2014 | | |
| WO | 9301221 A1 | 1/1993 | | |
| WO | 2010024119 A1 | 3/2010 | | |
| WO | 2013033553 A1 | 3/2013 | | |

OTHER PUBLICATIONS

JP2014505067A Machine Translation (Year: 2014).*
JP-2001323024-A Machine Translation (Year: 2001).*
JP2014533304-A Machine Translation (Year: 2014).*
English translation of International Search Report corresponding to International Patent Application No. PCT/JP2019/021815 (2 pages) (dated Aug. 13, 2019).
Extended European Search Report corresponding to European Patent Application No. 19815190.4 (6 pages) (dated Jan. 28, 2022).

* cited by examiner

*Primary Examiner* — Terressa Boykin
(74) *Attorney, Agent, or Firm* — Myers Bigel, P.A.

(57) ABSTRACT

The purpose of the present invention is to provide a polysiloxane monomer which gives an ophthalmic device with excellent wettability and a method for preparing the same. The present invention provides a compound represented by the following formula (1):

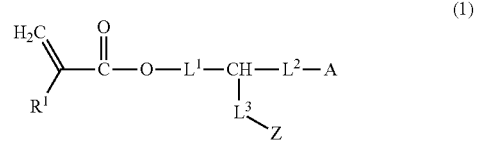

wherein $R^1$ is a hydrogen atom or a methyl group, $L^1$ is a single bond or a divalent hydrocarbon group which has 1 to 6 carbon atoms and may have at least one selected from an ether bond, an ester bond, and a urethane bond, Z is a monovalent organic group which has 1 to 10 carbon atoms and has a quaternary ammonium group or an amphoteric ion group, A is a linear or branched organo(poly)siloxanyl group having 1 to 100 siloxane units, $L^2$ is a linear, branched or cyclic, divalent or trivalent hydrocarbon group which has 2 to 10 carbon atoms and may have an ether bond, and $L^3$ is a divalent or trivalent hydrocarbon group having one carbon atom, provided that and when $L^3$ is trivalent, then $L^2$ is also trivalent, and $L^3$ and $L^2$ together form a ring.

20 Claims, No Drawings

POLYSILOXANE MONOMER AND METHOD FOR PRODUCING SAME

TECHNICAL FIELD

The present invention relates to a polysiloxane monomer. Specifically, the present invention provides a polysiloxane monomer suitable for preparing an ophthalmic device and a method for preparing the monomer.

BACKGROUND OF THE INVENTION

Monomers having a siloxane structure are known for preparing an ophthalmic device. For example, 3-[tris(trimethylsiloxy)silyl]propyl methacrylate (TRIS) is widely used as a monomer for contact lens. A polymer obtained by co-polymerizing TRIS and a hydrophilic monomer, such as N,N-dimethylacrylamide or N-vinyl-2-pyrrolidone, has a useful characteristic, high oxygen permeability. However, a highly hydrophobic polysiloxane monomer cannot be said to have high compatibility with the aforesaid hydrophilic monomer and, therefore, has a problem of phase separation to cause white turbidity in the preparation of a polysiloxane hydrogel for an ophthalmic device. Further, it also has a problem of reducing the surface wettability of the polysiloxane hydrogel to deteriorate the feeling in wearing an ophthalmic device. Accordingly, it was attempted to introduce a hydrophilic group such as an ionic group into a polysiloxane monomer to improve its compatibility with a hydrophilic monomer and surface wettability.

For example, Patent Literature 1 describes that introduction of a hydrophilic group into a terminal of a polysiloxane improves compatibility with a hydrophilic monomer and surface wettability. Further, Patent Literature 2 describes that introduction of a polyether group as a linking group between a polysiloxane moiety and a polymerizable group improves compatibility with a hydrophilic monomer.

PRIOR LITERATURE

Patent Literature

Patent Literature 1: Japanese National Phase Publication No. 2014-505067, corresponding to WO2012/104349
Patent Literature 2: Japanese Patent Application Laid-Open No. 2001-323024

SUMMARY OF THE INVENTION

Problems to be Solved by the Invention

The compound described in Patent Literature 1 improves compatibility on account of the presence of a hydrophilic group at its terminal, so that transparency of the obtained polysiloxane hydrogel is improved. Meanwhile, Patent Literature 1 does not describe surface wettability, and it is well surmised that the hydrophilic group does not well contribute to the surface wettability because the polysiloxane having high hydrophobicity is present at the linking site of the hydrophilic group. Further, a polyether group exists in a main chain of the monomer described in Patent Literature 2 and, therefore, does not sufficiently contribute to compatibility of the monomer, so that surface wettability of a device composed of this monomer is insufficient. Accordingly, the conventional polysiloxane monomer cannot provide an ophthalmic device having sufficient compatibility and wettability. Therefore, a compound and a composition which do not have the aforesaid disadvantages have been desired.

The present invention provides a polysiloxane monomer which gives an ophthalmic device with excellent wettability and a method for preparing the same.

Means for Solving the Problems

The present inventor has made research to solve the afore-mentioned problems and found that a (poly)siloxane monomer which has a polysiloxane structure at the end and has a hydrophilic group as a side chain of a linking group between the polysiloxane structure and a polymerizable group has excellent compatibility with other hydrophilic monomers, and a hydrogel composed of a copolymer obtained from the polysiloxane monomer and from a hydrophilic monomer has improved surface wettability.

Thus, the present invention provides a compound represented by the following formula (1):

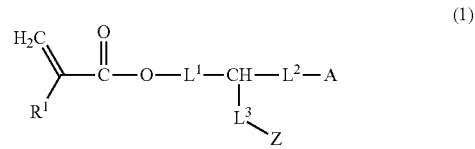

(1)

wherein $R^1$ is a hydrogen atom or a methyl group, $L^1$ is a single bond or a divalent hydrocarbon group which has 1 to 6 carbon atoms and may have at least one selected from an ether bond, an ester bond, and a urethane bond, Z is a monovalent organic group which has 1 to 10 carbon atoms and has a quaternary ammonium group or an amphoteric ion group, A is a linear or branched organo(poly)siloxanyl group having 1 to 100 siloxane units, $L^2$ is a linear, branched or cyclic, divalent or trivalent hydrocarbon group which has 2 to 10 carbon atoms and may have an ether bond, and $L^3$ is a divalent or trivalent hydrocarbon group having one carbon atom, provided that when $L^3$ is trivalent, then $L^2$ is also trivalent, and $L^3$ and $L^2$ together form a ring.

Effects of the Invention

Since the compound of the present invention has a highly hydrophilic group in a side chain, the compound is excellent in compatibility with other hydrophilic monomers, and a (co)polymer comprising a repeating unit derived from the present compound is excellent in oxygen permeability. The compound of the present invention is useful as a monomer for ophthalmic devices, e.g., contact lenses, intraocular lenses, artificial corneas, and spectacle lenses.

DETAILED DESCRIPTION OF THE INVENTION

The compound according to the present invention will be described below in further detail.

The present compound is a (poly)siloxane monomer represented by formula (1). The compound has a (poly)siloxane structure (represented by A) at the end and a hydrophilic group (Z) as a side chain (represented by -$L^3$-Z) bounded to a linking group which is represented by -$L^1$-CH-$L^2$- in formula (1) and exists between the polysiloxane structure and a terminal polymerizable group. The compound has excellent compatibility with a hydrophilic monomer, and the surface wettability of hydrogel obtained from the compound as a monomer is improved. The hydrophilic group is a side chain of the linking group and, therefore, has high mobility, so that the polysiloxane structure is surrounded with the hydrophilic group. On account of this conformation, the compatibility and the surface wettability are improved.

In formula (1), $R^1$ is a hydrogen atom or a methyl group. Among these, a methyl group is preferred.

In formula (1), $L^1$ is a single bond or a divalent hydrocarbon group which has 1 to 6 carbon atoms and may have at least one selected from an ether bond, an ester bond, and a urethane bond, or two or more of these bonds.

Examples of the divalent hydrocarbon group having 1 to 6 carbon atoms include a methylene group, an ethylene group, a 1,3-propylene group, a 1-methylpropylene group, a 1,1-dimethylpropylene group, a 2-methylpropylene group, a 1,2-dimethylpropylene group, a 1,1,2-trimethylpropylene group, a 1,4-butylene group, a 2-methyl-1,4-butylene group, a 2,2-dimethyl-1,4-butylene group, a 3-methyl-1,4-butylene group, a 2,2-dimethyl-1,4-butylene group, a 2,3-dimethyl-1,4-butylene group, a 1,5-pentylene group, and a 1,6-hexanylene group. Examples of the group having at least one of ether bond include polyalkylene oxide groups such as a polyethylene oxide group, a polypropylene oxide group, and a polyethylene-propylene oxide group. $L^1$ is preferably a single bond.

$L^2$ is a linear, branched or cyclic divalent or trivalent hydrocarbon group which has 2 to 10 carbon atoms and may have at least one of ether bond. Preferred is a linear or branched hydrocarbon group. Examples of the divalent hydrocarbon group include a 1,7-heptenylene group, a 1,8-octanylene group, a 1,9-rionanylene group, and a 1,10-decanylene group, in addition to the divalent hydrocarbon groups defined for $L^1$ in above. Examples of the group having at least one of ether bond include polyalkylene oxide groups such as a polyethylene oxide group, a polypropylene oxide group, and a polyethylene-propylene oxide group. Among these, —$CH_2OC_3H_6$— is preferred. When $L^2$ is trivalent, then $L^3$ and $L^2$ together form a ring.

$L^3$ is a divalent or trivalent hydrocarbon group having one carbon atom, i.e., methylene or methine. When $L^3$ is a metin group, $L^3$ bonds with $L^2$ to together form a ring.

In formula (1), when $L^3$ is divalent, the structure indicated by —CH($L^3$-)-$L^2$- is represented by the following formula (1a). When $L^3$ is trivalent, the ring structure formed by $L^3$ and $L^2$ is represented by the following formula (1b).

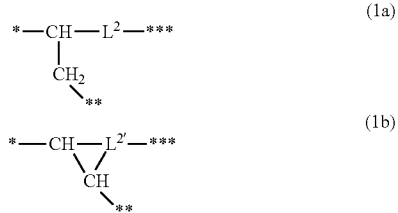
(1a)

(1b)

In formulas (1a) and (1b), $L^2$ is a linear, branched, or cyclic divalent hydrocarbon group having 2 to 10 carbon atoms, and may have an ether bond; $L^{2'}$ is a linear or branched divalent hydrocarbon group having 2 to 10 carbon atoms, and may have an ether bond; the site marked with * bonds to $L^1$; the site marked with  bonds to Z; and the site marked with * bonds to A.

Examples of the compound having the structure represented by formula (1a) include compounds represented by the following formula.

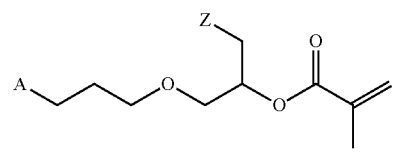

wherein A and Z are as defined above.

The structure represented by the above (1b) is preferably represented the following formula.

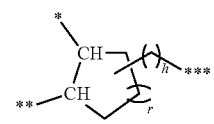

wherein r is an integer of from 0 to 8, preferably an integer of from 0 to 4, h is an integer of from 0 to 6, preferably an integer of from 0 to 2.

The following structure is more preferred.

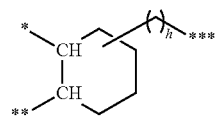

wherein h is an integer of from 0 and 6.

Examples of the compound having the structure of formula (1b) include compounds represented by the following formula.

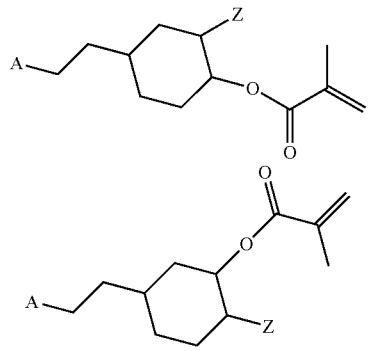

wherein A and Z are as defined above.

Z is a monovalent organic group having 1 to 10 carbon atoms and having a quaternary ammonium group or an amphoteric ion group. The group represented by the following formula (4) or (5) is preferred.

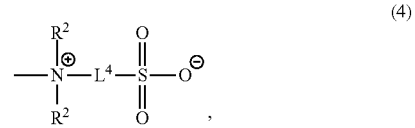
(4)

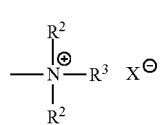

(5)

In formulas (4) and (5), $R^2$ is an alkyl group having 1 to 6 carbon atoms, $R^3$ is an alkyl group having 1 to 10 carbon atoms, $L^4$ is a divalent hydrocarbon group having 1 to 6 carbon atoms, and X is a halogen atom.

In formulas (4) and (5), $R^2$ is an alkyl group having 1 to 6 carbon atoms, preferably a methyl group.

In formula (5), $R^3$ is an alkyl group having 1 to 10 carbon atoms, preferably 1 to 4 carbon atoms.

In formula (4), $L^4$ is a divalent hydrocarbon group having 1 to 6 carbon atoms, preferably 3 or 4 carbon atoms.

More preferably, Z is a methyldimethylammonium group, an ethyldimethylammonium group, a propyldimethylammonium group, a butyldimethylammonium group, or a group represented by the following formula (a) or (b), wherein the site marked with ** bonds to a carbon atom.

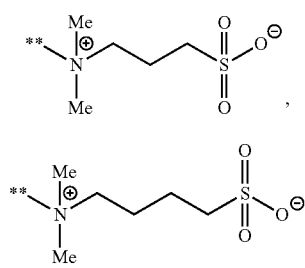

(a)

(b)

A is a linear or branched organo(poly)siloxanyl group having 1 to 100, preferably 2 to 20, siloxane units, and is preferably represented by the following formula (2) or (3).

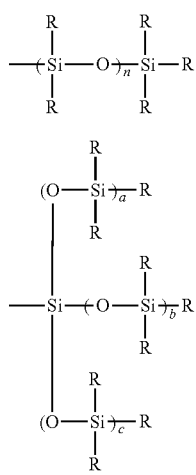

(2)

(3)

In formula (2), n is an integer of from 1 to 100, preferably an integer of from 2 to 20. In formula (3), a is an integer of from 0 to 10, preferably an integer of from 1 to 5, b is an integer of from 0 to 10, preferably an integer of from 1 to 5, c is an integer of from 0 to 10, preferably an integer of from 1 to 5, and at least two of a, b, and c are an integer of 1 or more. Preferably, a is 1, b is 1 and c is 0. R is, independently of each other, a monovalent hydrocarbon group having 1 to 10 carbon atoms.

R is, independently of each other, a monovalent hydrocarbon group having 1 to 10 carbon atoms, preferably 1 to 6 carbon atoms. Examples of the monovalent hydrocarbon group include alkyl groups such as a methyl group, an ethyl group, a propyl group, a butyl group, a pentyl group, a hexyl group, a heptyl group, an octyl group, a nonyl group, and a decyl group; cycloalkyl groups such as a cyclopentyl group and a cyclohexyl group; and aryl groups such as a phenyl group and a tolyl group. R is preferably an alkyl group having 1 to 6 carbon atoms or a phenyl group, more preferably a methyl group or a butyl group.

A method for preparing the compound represented by formula (1) will be described below. The present preparation method comprises a step of reacting a tertiary amino group-containing (poly)siloxane compound represented by the following formula (6):

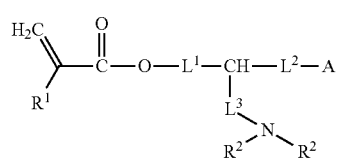

(6)

wherein L, $L^2$, $L^3$, A, $R^1$ and $R^2$ are as defined above, with a halogenated alkyl or alkylsulton compound to obtain the compound represented by formula (1), hereinafter referred to as step III.

The present method further comprises a step of reacting a secondary hydroxy group-containing (poly)siloxane compound represented by the following formula (7):

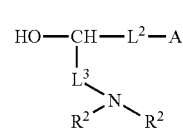

(7)

wherein $L^2$, $L^3$, A and $R^2$ are as defined above, with a (meth)acryl group-containing compound represented by the following formula (8) or (9):

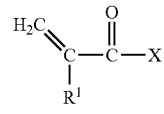

(8)

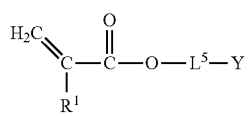

(9)

wherein $L^5$ is a divalent hydrocarbon group having 1 to 6 carbon atoms, and may comprise an ether bond, an ester bond, or a combination thereof; X is a halogen atom, $R^1$ is as defined above, and Y is an isocyanato group, to obtain the compound represented by formula (6), hereinafter referred to as step II.

In formula (9), $L^5$ is a divalent hydrocarbon group having 1 to 6 carbon atoms, and may have an ether bond, an ester bond, or a combination thereof.

The present method further includes a step of reacting an epoxy group-containing (poly)siloxane compound with a dialkylamine compound to obtain the compound represented by formula (7), hereinafter, referred to as step I.

The each step will be described below in detail.

Step I

In Step I, an epoxy group-containing (poly)siloxane compound is reacted with a dialkylamine compound to obtain a secondary hydroxyl group-containing (poly)siloxane compound represented by the following formula (7).

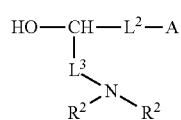

(7)

wherein $L^2$, $L^3$, A and $R^2$ are as defined above.

In formula (7), $L^2$ is a divalent hydrocarbon group having 2 to 10 carbon atoms, and may comprise an ether bond, as described above. If the number of carbon atoms is larger than the aforesaid upper limit, the siloxane content small, and the properties of the siloxane may not be exhibited.

As described above, $R^2$ is an alkyl group having 1 to 6 carbon atoms, preferably a methyl group. If the number of carbon atoms is larger than the aforesaid upper limit, the reactivity of the tertiary amine is poor in the reaction of Step III, and the desired product may not be obtained.

A is as defined above. If a, b, c or n is larger than the aforesaid upper limit, the reactivity of the (meth)acryl group is poor, and the unreacted (meth)acryl group may remain after the polymerization.

The reaction of the epoxy group-containing (poly)siloxane compound with the dialkylamine compound may be carried out according to any conventional method. For example, at least a molar equivalent amount of the dialkylamine compound may be added to the epoxy group-containing (poly)siloxane compound to allow to react. Although a reaction temperature is not particularly limited, it is preferred that the reaction temperature does not exceed a boiling point of a solvent used, for instance, from about 0 to about 120 degrees C. The reaction may be carried out in the presence of a solvent and/or a catalyst. Any conventional solvent and catalyst may be used and are not particularly limited.

Examples of the epoxy group-containing (poly) siloxane compound include a polydimethylsiloxane having one 3-glycidyloxypropyl group at one terminal and one butyl group at the other terminal, a polydimethylsiloxane having one 3-[2-(3,4-epoxycyclohexyl) ethyl] group at one terminal and one butyl group at the other terminal, (3-glycidyloxypropyl)bis(trimethylsiloxy)methylsilane, and 3-[2-(3,4-epoxycyclohexyl)ethyl]bis(trimethylsiiloxy)methylsilane.

The compound whose $L^3$ in formula (1) is divalent is obtained by using polydimethylsiloxane having a 3-glycidyloxy group at the terminal, such as polydimethylsiloxane having one 3-glycidyloxypropyl group at one terminal and one butyl group at the other terminal and (3-glycidyloxypropyl)bis(trimethylsiloxy)methylsilane, as a starting material.

The compound whose $L^3$ in formula (1) is trivalent and forms a ring together with $L^2$ is obtained by using polydimethylsiloxane having an epoxycycloalkyl group, such as an epoxycyclohexyl group, at a terminal as a starting material. For example, use is made of a polydimethylsiloxane having one 3-[2-(3,4-epoxycyclohexyl)ethyl] at one terminal and one butyl group at the other terminal, which is represented by the following formula, as a starting material,

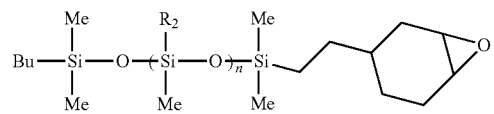

to obtain a compound represented b the following formulas.

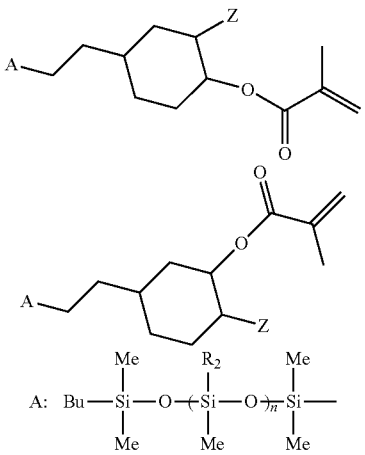

Examples of the dialkylamine compound include dimethylamine, diethylamine, dipropylamine, dibutylamine, dipentylamine, dihexylamine, ethylmethylamine, propylmethylamine, butylmethylamine, pentylmethylamine and hexylmethylamine. These may be in a form of solution, such as an aqueous solution, for easy handling.

Examples of the catalyst include organophosphorus compounds, tertiary amines, and Lewis acids. Examples of the organophosphorus compounds include tricyclohexylphosphine, tributylphosphine, trioctylphosphine, cyclohexyldiphenylphosphine, dicyclohexylphenylphosphine, butyldiphenylphosphine, dibutylphenylphosphine, octyldiphenylphosphine, dioctylphenylphosphine and triphenylphosphine. Examples of the tertiary amine include trimethylamine, triethylamine, tripropylamine, tributylamine, diazabicycloundecene, diazabicyclononene and 1-methylimidazole. Examples of the Lewis acid include boron trifluoride, aluminum chloride, methyldichloroaluminum, dimethylchloroaluminum, trimethylaluminum, magnesium chloride, magnesium bromide, titanium tetrachloride, dichlorotitanium bistriflate, biscyclopentadienyltitanium bistriflate, dichlorotitanium bisfluorosulfonate, tin tetrachloride and tin (II) bistriflate.

Examples of the solvent include glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether, and polyethylene glycol dimethyl ether; ester solvents such as ethyl acetate, butyl acetate, amyl acetate, ethyl lactate, and methyl benzoate; aliphatic hydrocarbon solvents such as linear hexane, linear heptane, and linear octane; alicyclic hydrocarbon-based solvents such as cyclohexane and ethyl cyclohexane; ketone solvents such as acetone, methyl ethyl ketone, and methyl isobutyl ketone; aromatic hydrocarbon solvents such as benzene, toluene, and xylene; and petroleum solvents. The solvents may be used alone or in a combination of two or more of them.

Step II.

Step II is to prepare the compound represented by formula (6) by reacting the secondary hydroxy group-containing (poly)siloxane compound represented by the following formula (7):

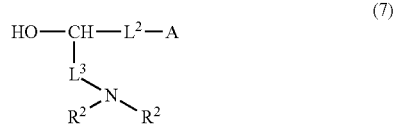

(7)

wherein $L^2$, $L^3$, A and $R^2$ are as described above, with a (meth)acryl group-containing compound represented by the following formula (8) or (9),

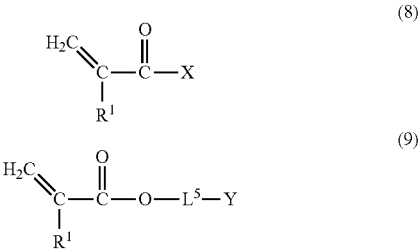

(8)

(9)

wherein $L^5$, $R^1$ and X are as described above, and Y is an isocyanato group.

The reaction may be conducted according to any conventional method. For example, the reaction may be conducted by adding at least a molar equivalent amount of the (meth)acryl group-containing compound represented by formula (8) or (9), to the secondary hydroxy group-containing (poly)siloxane compound represented by formula (7). The reaction temperature is not particularly limited and is preferably a temperature which does not exceed a boiling point of a solvent used. For instance, the reaction may be conducted at a temperature of about 0 to 80 degrees C. The reaction may be conducted in the presence of a catalyst or a solvent. Any known solvent and catalyst may be used and are not particularly limited. Any of the solvents described above may be used.

The (meth)acryl group-containing compound represented by formula (8) or (9) has a group reactive with a secondary hydroxy group. Examples of the reactive group include a halogenated alkyl group, an acyl halide group and an isocyanato group. Examples of the (meth)acryl group-containing compound represented by formula (8) or (9) include 2-isocyanatoethyl methacrylate, 2-isocyanatoethyl acrylate, methacrylic acid chloride, and acrylic acid chloride, but are not limited to them.

Examples of the catalyst include an organic metal catalyst and an amine catalyst. Examples of the organic metal catalyst, but not particularly limited, include organic tin catalysts such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate; and acetylacetone metal salts such as acetylacetone aluminium, acetylacetone iron, acetylacetone copper, acetylacetone zinc, acetylacetone beryllium, acetylacetone chromium, acetylacetone indium, acetylacetone manganese, acetylacetone molybdenum, acetylacetone titanium, acetylacetone cobalt, acetylacetone vanadium, and acetylacetone zirconium. Examples of the amine catalyst include pentamethyldiethylenetriamine, triethylamine, N-methylmorpholine bis(2-dimethylaminoethyl)ether, N,N,N',N'',N''-pentamethyldiethylenetriamine, N,N,N'-trimethylaminoethyl-ethanol amine, bis(2-dimethylaminoethyl)ether, N-methyl-N',N'-dimethylamino ethyl piperazine, N,N-dimethylcyclohexylamine, diazabicyclo undecene, triethylene diamine, tetramethyl hexamethylene diamine, N-methylimidazole, trimethylaminoethyl piperazine, tripropylamine, a tetramethyl ammonium salt, and a tetraethyl ammonium salt, and a triphenyl ammonium salt.

Step III.

Step III is to prepare a compound represented by formula (1) by reacting a tertiary amino group-containing (poly)siloxane compound represented by the following formula (6):

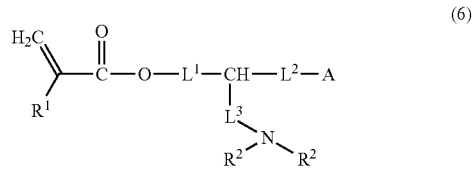

(6)

wherein $L^1$, $L^2$, $L^3$, A, $R^1$ and $R^2$ are as defined above, with a halogenated alkyl or alkylsulton compound.

The reaction may be conducted according to any conventional known method. For example, the reaction may be conducted by reacting one molar equivalent amount or less of the halogenated alkyl compound or the alkyl sultone compound, per mole of the tertiary amino group-containing (poly)siloxane compound represented by formula (6). The reaction temperature is not particularly limited and is preferably a temperature which does not exceed a boiling point of a solvent used. For instance, the reaction may be conducted at a temperature of about 0 to 120 degrees C. The reaction may be conducted in the presence of a catalyst in addition to the solution. Any known solvent and catalyst may be used and are not particularly limited. Any of the solvents described above can be used.

Examples of the halogenated alkyl compound, but not particularly limited, include methyl chloride, ethyl chloride, propyl chloride, butyl chloride, pentyl chloride, hexyl chloride, methyl bromide, ethyl bromide, propyl bromide, butyl bromide, pentyl bromide, hexyl bromide, methyl iodide, ethyl iodide, propyl iodide, butyl iodide, pentyl iodide and hexyl iodide.

Examples of the alkyl sultone compound, but not particularly limited, include propane sultone and butane sultone.

Examples of the catalyst include a metal catalyst and an amine catalyst. Examples of the metal catalyst, but not particularly limited, include alkali metal salt catalysts such as lithium chloride, sodium chloride, potassium chloride, lithium bromide, sodium bromide, potassium bromide, lithium iodide, sodium iodide, and potassium iodide; and alkaline earth metal catalysts such as magnesium chloride, calcium chloride, magnesium bromide, calcium bromide, magnesium iodide and calcium iodide. Any of the amine catalysts described above can be used.

In any of the aforementioned reactions, the completion of the reaction can be determined by confirming the disappearance of peaks of the starting compounds according to a conventional method, for instance, using thin-layer chromatography (TCL), high performance liquid chromatography (HPLC), or gas chromatography (GC). After the completion of the reaction, the obtained product may be purified by the conventional method. For example, the obtained product is isolated by washing the organic layer with water and then removing the solvent. Distillation at a reduced pressure and an active carbon treatment may also be used.

As an example of the preparation method, one mole of the epoxy group-containing (poly)siloxane compound and two moles of the dialkylamine compound are placed in a reactor, and heated with stirring at 100 degrees C. The reaction completes in about 4 hours. The progress of the reaction can be followed by monitoring the epoxy group-containing (poly)siloxane compound or the produced secondary hydroxy group-containing (poly)siloxane by GC or the like. After the completion of the reaction, one mass equivalent of toluene is added, and an organic layer is washed with water and subjected to distillation to remove any unreacted starting materials at a reduced pressure. Thus, the secondary hydroxy group-containing (poly)siloxane compound represented by formula (7) is obtained.

Subsequently, one mole of the secondary hydroxy group-containing (poly)siloxane compound represented by formula (7), one mole of the triethylamine, and one mass equivalent of toluene are placed in a reactor and, then, one molar equivalent of methacrylic acid chloride represented by formula (8) is added. After the addition, stirring is conducted at room temperature. The reaction completes in about 10 hours. The progress of the reaction can be followed by monitoring the methacrylic acid chloride by GC or the like. After the completion of the reaction, an organic phase is washed with water and subjected to distillation to remove the solvent off and the unreacted starting materials remaining in the organic phase at a reduced pressure. Thus, the tertiary amino group-containing (poly)siloxane compound represented by formula (6) is obtained.

Subsequently, one mole of the tertiary amino group-containing (poly)siloxane compound represented by formula (6), 1.2 moles of propanesultone, and three mass equivalent of acetonitrile are placed in a reactor and stirred at 80 degrees C. The reaction completes in about 6 hours. The progress of the reaction can be followed by monitoring the tertiary amino group-containing (poly)siloxane compound or propanesultone by GC or the like. After the completion of the reaction, four mass equivalent of n-hexane is added and a lower layer is discarded. One mass equivalent of acetonitrile is added and a lower layer is discarded, which procedure are repeated twice, so that any unreacted sultone compound is removed. The upper layer is subjected to distillation at a reduced pressure to remove the solvent in the upper layer and the unreacted starting materials. Thus, the (poly)siloxane compound of the present invention represented by formula (6) is obtained.

The compound according to the present invention can provide a polymer having a repeating unit derived from the addition polymerization at a (meth)acryl group. The compound according to the present invention is well compatible with other compounds having a polymerizable group such as a (meth)acryl group, hereinafter referred to as a polymerizable monomer or a hydrophilic monomer. Therefore, the compound according to the present invention is copolymerizable with the polymerizable monomer to provide a colorless and transparent copolymer. Moreover, the compound according to the present invention can be polymerized alone.

In the preparation of the copolymer having the repeating unit derived from polymerization of the present silicone compound and the other polymerizable (hydrophilic) monomer, the proportion of the present silicone compound to be added may be such that the mass proportion of the repeating unit derived from the present silicone compound is 10% or more, relative to the total mass of the copolymer. Specifically, the amount of the present compound is preferably 10 to 80 parts by mass, more preferably 20 to 60 parts by mass, relative to the total 100 parts by mass of the present compound and the polymerizable (hydrophilic) monomer.

Examples of the polymerizable monomer include acrylic monomers such as (meth)acrylic acid, methyl(meth)acrylate, ethyl(meth)acrylate, (poly)ethylene glycol dimethacrylate, polyalkylene glycol mono(meth)acrylate, polyalkylene glycol monoalkylether(meth)acrylate, trifluoroethyl(meth) acrylate, 2-hydroxyethyl(meth)acrylate, and 2,3-dihydroxypropyl(meth)acrylate; acrylic acid derivatives such as N,N-dimethylacrylamide, N,N-diethylacrylamide, N-acryloylmorpholine, and N-methyl(meth)acrylamide; N-vinylpyrrolidone, other unsaturated aliphatic compounds or aromatic compounds such as crotonic acid, cinnamic acid, and vinylbenoic acid; and a siloxane monomer having a polymerizable group such as a (meth)acryl group. These polymerizable monomers may be used alone or in a combination of two or more of them.

The copolymerization of the present compound and the other polymerizable monomer may be conducted according to a conventional method. For example, the copolymerization can be conducted using a known polymerization initiator such as a thermal polymerization initiator or a photopolymerization initiator. Examples of the polymerization initiator include 2-hydroxy-2-methyl-1-phenyl-propane-1-one, azobisisobutyronitrile, azobis dimethylvaleronitrile, benzoyl peroxide, tert-butyl hydroperoxide, and cumene hydroperoxide. These polymerization initiators may be used alone or in a combination of two or more of them. The amount of the polymerization initiator is 0.001 to 2 parts by mass, preferably 0.01 to 1 part by mass, relative to 100 parts by mass of the total amount of the polymerizable starting materials.

The polymer having the repeating unit derived from the present compound has excellent oxygen permeability. The hydrogel obtained from the polymer has excellent surface wettability. Therefore, the present compound is suitable for the production of ophthalmic devices such as contact lenses, intraocular lenses, and artificial corneas. A method for preparing the ophthalmic device using the polymer is not particularly limited and may be according to any conventional one. For example, a cutting means or a template (molding) may be used for forming lenses such as contact lenses and intraocular lenses.

EXAMPLES

The present invention will be explained below in further detail with reference to a series of the Examples and the Comparative Examples, though the present invention is in no way limited by these Examples. In the following Examples, $^1$H-NMR analysis was performed using ECS400 manufactured by JEOL and deuterated chloroform as a solvent for measurement.

Example 1

[Step I]

To a 1 L, three-necked flask equipped with a dimroth condenser and a thermometer, were added 140.0 g of an epoxy compound represented by the following formula (10A), 214.0 g of a 50% aqueous solution of N,N-dimethylamine, and 140.0 g of toluene, and the mixture was stirred at 50 degrees C. for 4 hours. After the completion of the reaction, the mixture was washed with deionized water three times, and the unreacted starting materials were distilled off at an inner temperature of 80 degrees C. and a reduced pressure, to obtain a colorless, transparent liquid in a yield of 140.6 g. $^1$H-NMR analysis showed that the obtained one was a compound represented by the following formula (11A).

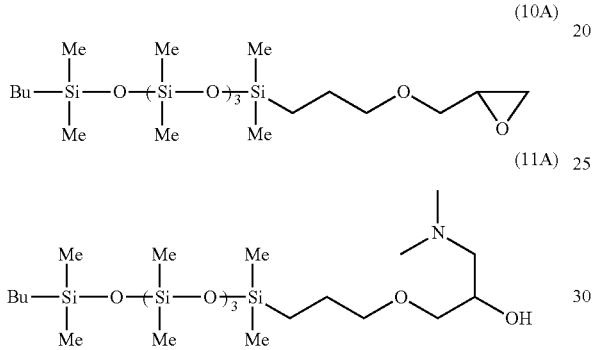

[Step II]

To a 1 L, three-necked flask equipped with a dimroth condenser, a thermometer, and a dropping funnel, were added 130.0 g of the compound represented by formula (11A) obtained in step I, 33.8 g of triethylamine, and 520.0 g of toluene, and the mixture was cooled to 10 degrees C. To this mixture, 35.0 g of methacryloyl chloride was added dropwise, and the mixture was then aged at 20 degrees C. for 4 hours. The mixture after the reaction was washed with deionized water three times to remove a by-producted salt, and the solvent and by-products were distilled off at an inner temperature of 80 degrees C. and a reduced pressure to obtain 127.3 g of a colorless transparent liquid. $^1$H-NMR analysis showed that the obtained one was a compound represented by the following formula (12A).

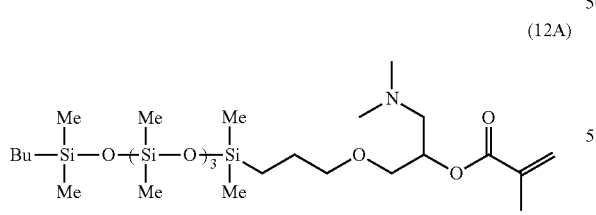

$^1$H-NMR data are as follows:

0.0 ppm (30H), 0.5 ppm (4H), 0.9 ppm (3H), 1.3 ppm (4H), 1.6 ppm (2H), 2.0 ppm (3H), 2.3 ppm (6H), 2.5 ppm (2H), 3.4 ppm (2H), 3.6 ppm (2H), 5.2 ppm (1H), 5.6 ppm (1H), 6.1 ppm (1H)

[Step III]

To a 1 L, three-necked flask equipped with a dimroth condenser, a thermometer, and a dropping funnel, were added 60.0 g of the compound represented by formula (12A) obtained in step II, 20.6 g of 1,3-propanesultone, and 180.0 g of acetonitrile, and the mixture was aged at 80 degrees C. for 6 hours. To this mixture, 240.0 g of n-hexane was added, washed three times with acetonitrile, and the solvent was distilled off at an internal temperature of 80 degrees C. and a reduced pressure to obtain 51.3 g of a colorless, transparent greasy solid. $^1$H-NMR analysis showed that the obtained one was a compound represented by the following formula (13A).

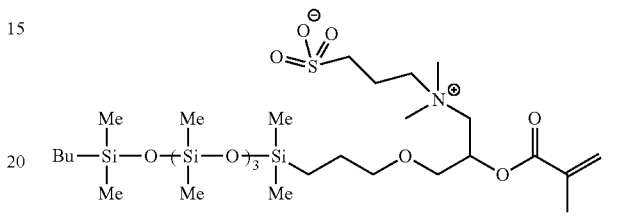

$^1$H-NMR data are as follows:

0.0 ppm (30H), 0.5 ppm (4H), 0.9 ppm (3H), 1.3 ppm (4H), 1.6 ppm (2H), 2.0 ppm (3H), 2.3 ppm (2H), 2.9 ppm (2H), 3.2 ppm (6H), 3.4 ppm (2H), 3.5-3.6 ppm (2H), 3.8 ppm (2H), 3.9 ppm (2H), 5.5 ppm (1H), 5.7 ppm (1H), 6.2 ppm (1H)

Example 2

[Step I]

Step I of Example 1 was repeated, except that the epoxy compound represented by formula (10A) in Step I of Example 1 was replaced with an epoxy compound represented by the following formula (10B) to obtain a colorless, transparent liquid. The yield was 143.1 g. $^1$H-NMR analysis showed that the obtained one was a compound represented by the following formula (11B).

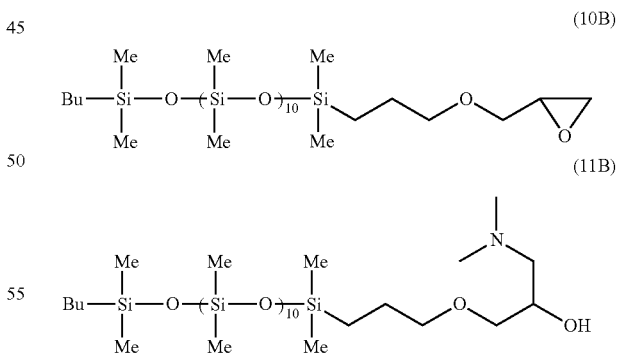

[Step II]

Step II of Example 1 was repeated, except that the compound represented by formula (11A) in Step II of Example 1 was replaced with a compound represented by formula (11B) to obtain a colorless, transparent liquid. The yield was 129.0 g. $^1$H-NMR analysis showed that the obtained one was a compound represented by the following formula (12B).

(12B)

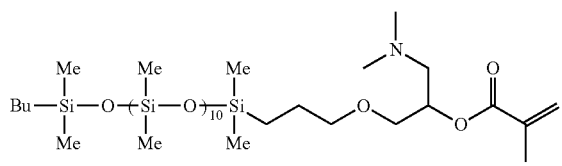

¹H-NMR data are as follows:

0.0 ppm (72H), 0.5 ppm (4H), 0.9 ppm (3H), 1.3 ppm (4H), 1.6 ppm (2H), 2.0 ppm (3H), 2.3 ppm (6H), 2.5 ppm (2H), 3.4 ppm (2H), 3.6 ppm (2H), 5.2 ppm (1H), 5.6 ppm (1H), 6.1 ppm (1H)

[Step III]

Step III of Example 1 was repeated, except that the compound represented by formula (12A) in Step III of Example 1 was replaced with the compound represented by formula (12B) to obtain a colorless, transparent greased solid. The yield was 55.5 g. ¹H-NMR analysis showed that the obtained one was a compound represented by the following formula (13B).

(13B)

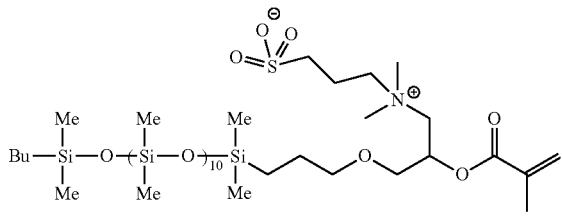

¹H-NMR data are as follows:

0.0 ppm (72H), 0.5 ppm (4H), 0.9 ppm (3H), 1.3 ppm (4H), 1.6 ppm (2H), 2.0 ppm (3H), 2.3 ppm (2H), 2.9 ppm (2H), 3.2 ppm (6H), 3.4 ppm (2H), 3.5-3.6 ppm (2H), 3.8 ppm (2H), 3.9 ppm (2H), 5.5 ppm (1H), 5.7 ppm (1H), 6.2 ppm (1H)

Example 3

[Step I]

Step I of Example 1 was repeated, except that the epoxy compound represented by formula (10A) in Step I of Example 1 was replaced with an epoxy compound represented by formula (10C) to obtain a colorless, transparent liquid. The yield was 135.2 g. ¹H-NMR analysis showed that the obtained one was a compound represented by the following formula (11C).

(10C)

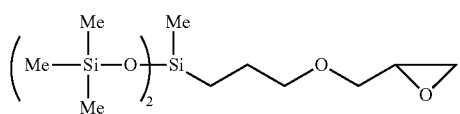

(11C)

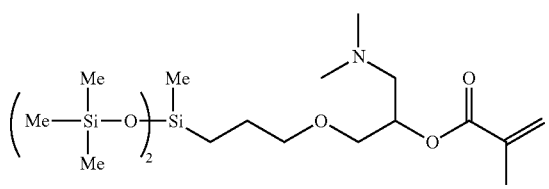

[Step II]

Step II of Example 1 was repeated, except that the compound represented by formula (11A) in Step II of Example 1 was replaced with a compound represented by formula (11C) to obtain a colorless, transparent liquid. The yield was 120.0 g. ¹H-NMR analysis showed that the obtained one was a compound represented by the following formula (12C).

(12C)

¹H-NMR data are as follows:

0.0 ppm (21H), 0.4 ppm (2H), 1.6 ppm (2H), 2.0 ppm (3H), 2.3 ppm (6H), 2.5 ppm (2H), 3.4 ppm (2H), 3.6 ppm (2H), 5.2 ppm (1H), 5.6 ppm (1H), 6.1 ppm (1H)

[Step III]

Step III of Example 1 was repeated, except that the compound represented by formula (12A) in Step III of Example 1 was replaced with a compound represented by formula (12C) to obtain a white solid. The yield was 50.7 g. ¹H-NMR analysis showed that the obtained one was a compound represented by the following formula (13C).

(13C)

¹H-NMR data are as follows:

0.0 ppm (21H), 0.5 ppm (2H), 1.6 ppm (2H), 2.0 ppm (3H), 2.3 ppm (2H), 2.9 ppm (2H), 3.2 ppm (6H), 3.4 ppm (2H), 3.5-3.6 ppm (2H), 3.8 ppm (2H), 3.9 ppm (2H), 5.5 ppm (1H), 5.7 ppm (1H), 6.2 ppm (1H)

Example 4

To a 1 L, three-necked flask equipped with a dimroth condenser, a thermometer, and a dropping funnel, were added 60.0 g of the compound represented by formula (12A) obtained in Step II of Example 1, 26.6 g of 1-bromobutane, and 180.0 g of acetonitrile, and the mixture was aged at 80 degrees C. for 6 hours. To the solution after the reaction, 240.0 g of n-hexane was added, the mixture was washed with acetonitrile three times, and the solvent was distilled off at an internal temperature of 80 degrees C. and reduced pressure to obtain a colorless, transparent liquid. The yield was 55.2 g. $^1$H-NMR analysis showed that the obtained one was a compound represented by the following formula (14A).

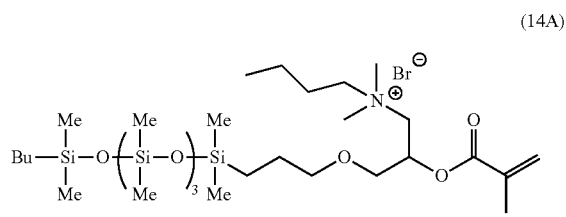

(14A)

$^1$H-NMR data are as follows:

0.0 ppm (30H), 0.5 ppm (4H), 0.9 ppm (3H), 1.0 ppm (3H), 1.3-1.4 ppm (8H), 1.6 ppm (2H), 2.0 ppm (3H), 3.2 ppm (6H), 3.3 ppm (2H), 3.4 ppm (2H), 3.5-3.6 ppm (2H), 3.8 ppm (2H), 5.5 ppm (1H), 5.7 ppm (1H), 6.2 ppm (1H)

Example 5

The procedures of Example 4 were repeated, except that the compound represented by formula (12A) was replaced with the compound represented by formula (12B) obtained in Step II of Example 2 to obtain a colorless, transparent liquid. The yield was 54.6 g. $^1$H-NMR analysis showed that the obtained one was a compound represented by the following formula (14B).

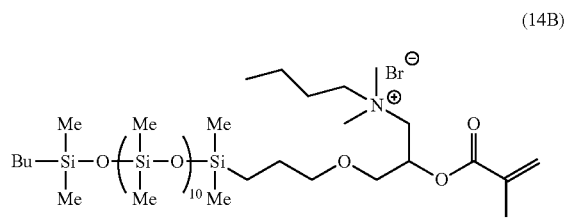

(14B)

$^1$H-NMR data are as follows:

0.0 ppm (72H), 0.5 ppm (4H), 0.9 ppm (3H), 1.0 ppm (3H), 1.3-1.4 ppm (8H), 1.6 ppm (2H), 2.0 ppm (3H), 3.2 ppm (6H), 3.3 ppm (2H), 3.4 ppm (2H), 3.5-3.6 ppm (2H), 3.8 ppm (2H), 5.5 ppm (1H), 5.7 ppm (1H), 6.2 ppm (1H)

Example 6

The procedures of Example 4 were repeated, except that the compound represented by formula (12A) was replaced with the compound represented by formula (12C) obtained in Step II of Example 3 to obtain a white solid. The yield was 46.9 g. $^1$H-NMR analysis showed that the obtained one was a compound represented by the following formula (14C).

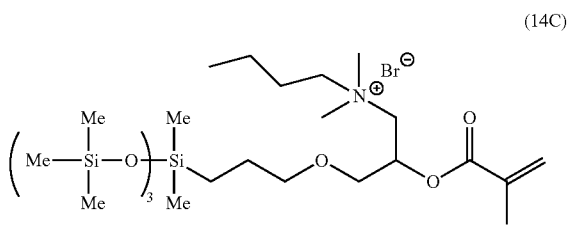

(14C)

1H-NMR data are as follows:

0.0 ppm (21H), 0.5 ppm (2H), 1.0 ppm (3H), 1.3-1.4 ppm (4H), 1.6 ppm (2H), 2.0 ppm (3H), 3.2 ppm (6H), 3.3 ppm (2H), 3.4 ppm (2H), 3.5-3.6 ppm (2H), 3.8 ppm (2H), 5.5 ppm (1H), 5.7 ppm (1H), 6.2 ppm (1H)

Comparative Examples 1 to 3

Compounds used in Comparative Examples 1 to 3 are as follows.
SiGMA: methylbis(trimethylsiloxy)silylpropyl glycerol methacrylate
mPDMS: polydimethylsiloxane having a monomethacryloxypropyl radical at one end and a monobutyl group at the other end and having a molecular weight of 800 to 1000.
TRIS-PEG2: 2-methyl-2-[2-[3-[3,3,3-trimethyl-1,1-bis [(trimethylsilyl)oxy]-1-disiloxanyl]propoxy]ethoxy] ethyl acrylate

[Preparation of Polymer]

Each of the compounds obtained in the Examples 1-6 or the Comparative Examples 1-3, N-vinylpyrrolidone (NVP), ethylene glycol dimethacrylate (EGDMA), and IRGACURE 1173 (Irg 1173) were mixed in the amounts shown in Table 1 and stirred until a uniform solution was obtained. After the stirring, N$_2$ was bloom into the solution for five minutes.

The solution was sufficiently deaerated, and poured in a polypropylene mold. The solution was irradiated by UV with a high pressure mercury lamp to cause curing. The cured product was soaked in isopropanol, a 50% isopropanol aqueous solution, and then deionized water for washing, so that a hydrogel film was obtained. The properties of the obtained hydrogel film were determined according to the following methods. The results are as shown in Table 1.

[Equilibrium Water Content]

Each of the films was soaked in deionized water at 25 degrees C. for 48 hours and, then, water on the surface of the film was wiped away. Thus, the hydrated film was formed. The hydrated film was weighed. Subsequently, the hydrated film was dried at 50 degrees C. for 48 hours and further at 25 degrees C. for 24 hours in an oven, and the mass of the dried film was weighed. The equilibrium water content was calculated according to the following equation.

Equilibrium water content (%)=100×(mass of the hydrated film−mass of the dried film)/mass of the hydrated film

[Transparency]

A film was soaked in deionized water at 25 degrees C. for 48 hours and, then, water on the surface of the film was wiped away. Thus, the hydrated film was provided. Appearance of the hydrated film was then observed with the naked eye and evaluated according to the following criteria.

A: uniform and transparent
B: ununiform or clouded

[Compatibility with a Hydrophilic Monomer]

Compatibility with a hydrophilic monomer, N-vinylpyrrolidone (NVP) widely used in the production of ophthalmic devices was evaluated. Specifically, equal masses of the polysilicone compound of Examples or Comparative Examples and NVP were mixed, and stirred at 25 degrees C. for 10 minutes. After the stirring, the mixture was left still at 25 degrees C. for five hours, and the appearance of the mixture was then observed visually and evaluated according to the following criteria.

A: uniform and transparent
B: clouded
C: the silicone compound and NVP separated completely

[Contact Angle]

The contact angle (°) of each of the hydrated films obtained above with water was determined by a sessile drop method using a contact angle meter CA-D (ex. Kyowa Interface Science Co. Ltd.).

TABLE 1

|  |  | Ex. 1 | Ex.2 | Ex.3 | Ex. 4 | Ex. 5 | Ex.6 | Com. Ex. 1 | Com. Ex.2 | Com. Ex. 3 |
|---|---|---|---|---|---|---|---|---|---|---|
| Siloxane monomer | 13A | 50 | — | — | — | — | — | — | — | — |
|  | 13B | — | 50 | — | — | — | — | — | — | — |
|  | 13C | — | — | 50 | — | — | — | — | — | — |
|  | 14A | — | — | — | 50 | — | — | — | — | — |
|  | 14B | — | — | — | — | 50 | — | — | — | — |
|  | 14C | — | — | — | — | — | 50 | — | — | — |
| Comparative compound | SIGMA | — | — | — | — | — | — | 50 | — | — |
|  | mPDMS | — | — | — | — | — | — | — | 50 | — |
|  | TRIS-PEG2 | — | — | — | — | — | — | — | — | 50 |
| Polymerizable monomer | NVP | 50 | 50 | 50 | 50 | 50 | 50 | 50 | 50 | 50 |
|  | EGDMA | 0.5 | 0.5 | 0.5 | 0.5 | 0.5 | 0.5 | 0.5 | 0. 5 | 0.5 |
|  | Irg1173 | 0.04 | 0.04 | 0.04 | 0.04 | 0.04 | 0.04 | 0.04 | 0.04 | 0.04 |
| Results | Equilibrium water content, % | 46.4 | 45.1 | 46.8 | 45.9 | 44.6 | 45.5 | 46.8 | 43.1 | 44.9 |
|  | Transparency | A | A | A | A | A | A | A | B | A |
|  | Compatibility with NVP | A | A | A | A | A | A | A | C | B |
|  | Contact angle, ° | 49 | 52 | 51 | 51 | 55 | 51 | 90 | 104 | 95 |

As shown in Table 1, the compound according to the present invention has excellent compatibility with a hydrophilic monomer, and the hydrogel obtained by copolymerization of the present compound has high transparency and excellent surface wettability.

INDUSTRIAL APPLICABILITY

The compound according to the present invention attains an improved surface wettability of an obtained hydrogel. The present compound is useful as a monomer for preparing ophthalmic devices such as a contact lens, an intraocular lens, an artificial cornea, and a lens for eyewears.

The invention claimed is:

1. A compound represented by the following formula (1):

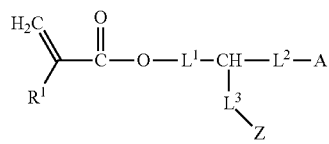

(1)

wherein $R^1$ is a hydrogen atom or a methyl group, $L^1$ is a single bond or a divalent hydrocarbon group which has 1 to 6 carbon atoms and may have at least one selected from an ether bond, an ester bond, and a urethane bond, Z is a monovalent organic group which has 1 to 10 carbon atoms and has a quaternary ammonium group or an amphoteric ion group, A is a linear or branched organo(poly)siloxanyl group having 1 to 100 siloxane units, $L^2$ is a linear, branched or cyclic, divalent or trivalent hydrocarbon group which has 2 to 10 carbon atoms and may have an ether bond, and $L^3$ is a divalent or trivalent hydrocarbon group having one carbon atom, provided that when $L^3$ is trivalent, then $L^2$ is also trivalent, and $L^3$ and $L^2$ together form a ring.

2. The compound according to claim 1, wherein A is represented by the following formula (2) or (3):

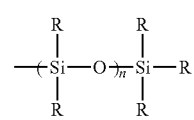

(2)

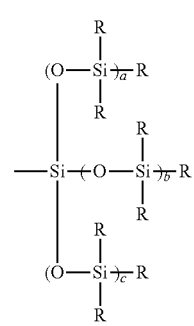

(3)

wherein n is an integer of from 1 to 100, a is an integer of from 0 to 10, b is an integer of from 0 to 10, c is an integer of from 0 to 10, at least two of a, b and c are an integer of 1 or larger, and R is, independently of each other, a monovalent hydrocarbon group having 1 to 10 carbon atoms.

3. The compound according to claim 1, wherein $R^1$ is a methyl group.

4. The compound according to claim 2, wherein A is represented by formula (2) and n is an integer of from 2 to 20.

5. The compound according to claim 2, wherein A is represented by formula (3), a is 1, b is 1 and c is 0.

6. The compound according to claim 1, wherein $L^2$ is $-CH_2OC_3H_6-$.

7. The compound according to claim 2, wherein R is an alkyl group having 1 to 6 carbon atoms or a phenyl group.

8. The compound according to claim 7, wherein R is a methyl group or a butyl group.

9. The compound according to claim 1, wherein Z is represented by the following formula (4) or (5):

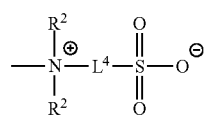

(4)

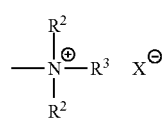

(5)

wherein $R^2$ is an alkyl group having 1 to 6 carbon atoms, $R^3$ is an alkyl group having 1 to 10 carbon atoms, $L^4$ is a divalent hydrocarbon group having 1 to 6 carbon atom and X is a halogen atom.

10. The compound according to claim 9, wherein $R^2$ is a methyl group.

11. A polymer comprising repeating units derived from polymerization at the (meth)acryl group of the compound according to claim 1.

12. A polysiloxane hydrogel comprising the polymer according to claim 11.

13. A compound represented by the following formula (6):

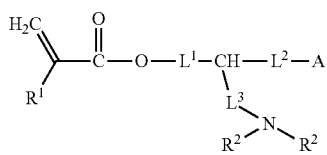

(6)

wherein $R^1$ is a hydrogen atom or a methyl group, $R^2$ is an alkyl group having 1 to 6 alkyl group, $L^1$ is a single bond or a divalent hydrocarbon group which has 1 to 6 carbon atoms and may have at least one selected from an ether bond, an ester bond, and a urethane bond, A is a linear or branched organo(poly)siloxanyl group having 1 to 100 siloxane units, $L^2$ is a linear, branched or cyclic, divalent or trivalent hydrocarbon group which has 2 to 10 carbon atoms and may have an ether bond, and $L^3$ is a divalent or trivalent hydrocarbon group having one carbon atom, provided that when $L^3$ is trivalent, then $L^2$ is also trivalent, and $L^3$ and $L^2$ together form a ring.

14. A method for preparing a compound represented by the following formula (1):

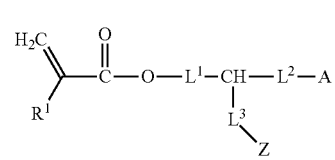

(1)

wherein $R^1$ is a hydrogen atom or a methyl group, $L^1$ is a single bond or a divalent hydrocarbon group which has 1 to 6 carbon atoms and may have at least one selected from an ether bond, an ester bond, and a urethane bond, Z is a monovalent organic group which has 1 to 10 carbon atoms and has a quaternary ammonium group or an amphoteric ion group, A is a linear or branched organo(poly)siloxanyl group having 1 to 100 siloxane units, $L^2$ is a linear, branched or cyclic, divalent or trivalent hydrocarbon group which has 2 to 10 carbon atoms and may have an ether bond, and $L^3$ is a divalent or trivalent hydrocarbon group having one carbon atom, provided that when $L^3$ is trivalent, then $L^2$ is also trivalent, and $L^3$ and $L^2$ together form a ring, comprising a step of reacting a tertiary amino group-containing (poly)siloxane compound represented by the following formula (6):

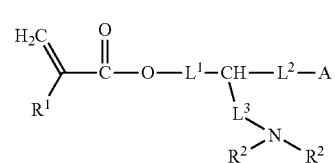

(6)

wherein $L^1$, $L^2$, $L^3$, A and $R^1$ are as defined above, and $R^2$ is an alkyl group having 1 to 6 carbon atoms, with a halogenated alkyl compound or an alkylsulton compound to obtain the compound represented by formula (1).

15. The method according to claim 14, wherein Z is represented by the following formula (4) or (5):

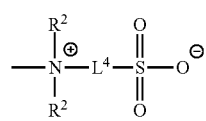

(4)

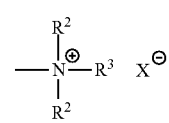

(5)

wherein $R^2$ is an alkyl group having 1 to 6 carbon atoms, $R^3$ is an alkyl group having 1 to 10 carbon atoms, $L^4$ is a divalent hydrocarbon group having 1 to 6 carbon atoms and X is a halogen atom.

16. The method according to claim 14, further comprising a step of reacting a secondary alcohol-containing (poly)siloxane compound represented by the following formula (7):

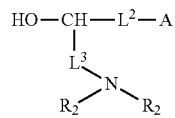

(7)

wherein $L^2$, $L^3$, A and $R^2$ are as defined above,
with a (meth)acryl group-containing compound represented by the following formula (8) or (9):

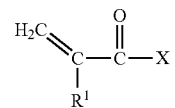

(8)

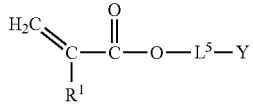

(9)

wherein $L^5$ is a divalent hydrocarbon group having 1 to 6 carbon atoms and may have an ether bond, an ester bond, or a combination thereof, $R^1$ and X are as defined above, and Y is an isocyanato group,
to obtain the compound represented by formula (6).

17. The method according to claim 14, further comprising a step of reacting an epoxy group-containing (poly)siloxane compound with a dialkylamine compound to obtain the secondary alcohol-containing (poly)siloxane compound represented by formula (7).

18. The method according to claim 14, wherein A is represented by the following formula (2) or (3):

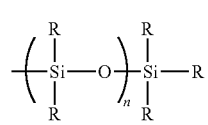

(2)

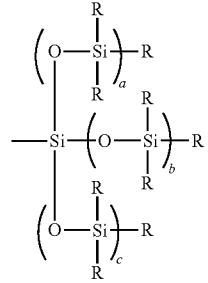

(3)

wherein n is an integer of from 1 to 100, a is an integer of from 0 to 10, b is an integer of from 0 to 10, c is an integer of from 0 to 10, provided that at least two of a, b and c are an integer of 1 or larger, and R is, independently of each other, a monovalent hydrocarbon group having 1 to 10 carbon atoms.

19. The method according to claim 18, wherein A is represented by formula (2) and n is an integer of from 2 to 20.

20. The method according to claim 18, wherein A is represented by formula (3), a is 1, b is 1 and c is 0.

* * * * *